US009665596B2

(12) United States Patent
Ramanujapuram et al.

(10) Patent No.: US 9,665,596 B2
(45) Date of Patent: May 30, 2017

(54) DATA ACCESS BASED ON CONTENT OF IMAGE RECORDED BY A MOBILE DEVICE

(71) Applicant: Yahoo! Inc., Sunnyvale, CA (US)

(72) Inventors: Arun Ramanujapuram, Bangalore (IN); Malcolm Slaney, Santa Clara, CA (US)

(73) Assignee: YAHOO! INC., Sunnyvale, CA (US)

( * ) Notice: Subject to any disclaimer, the term of this patent is extended or adjusted under 35 U.S.C. 154(b) by 0 days.

(21) Appl. No.: 15/284,607

(22) Filed: Oct. 4, 2016

(65) Prior Publication Data

US 2017/0024414 A1    Jan. 26, 2017

Related U.S. Application Data

(63) Continuation of application No. 13/849,968, filed on Mar. 25, 2013, now Pat. No. 9,483,499, which is a
(Continued)

(51) Int. Cl.
*G06K 9/62* (2006.01)
*G06F 17/30* (2006.01)
*G06K 9/46* (2006.01)

(52) U.S. Cl.
CPC .... *G06F 17/30253* (2013.01); *G06F 17/3028* (2013.01); *G06F 17/30256* (2013.01); *G06K 9/4671* (2013.01); *G06K 2209/01* (2013.01)

(58) Field of Classification Search
None
See application file for complete search history.

(56) References Cited

U.S. PATENT DOCUMENTS 7,133,555 B2   11/2006   Acharya et al.
7,587,403 B2    9/2009   Sohma et al.
(Continued)

FOREIGN PATENT DOCUMENTS

CN        1577319 A      12/2005
JP       2005190155       7/2005

OTHER PUBLICATIONS

Official Action in corresponding CN Application No. 201410374755.8 mailed Feb. 4, 2017 (8 pages).

*Primary Examiner* — Manav Seth
*Assistant Examiner* — David Perlman
(74) *Attorney, Agent, or Firm* — James J. DeCarlo; Greenberg Traurig, LLP

(57) ABSTRACT

Embodiments of the invention are directed to using image data and contextual data to determine information about a scene, based on one or more previously obtained images. Contextual data, such location of image capture, can be used to determine previously obtained images related to the contextual data and other location-related information, such as billboard locations. With even low resolution devices, such as cell phone, image attributes, such as a histogram or optically recognized characters, can be compared between the previously obtained images and the newly captured image. Attributes matching within a predefined threshold indicate matching images. Information on the content of matching previously obtained images can be provided back to a user who captured the new image. User profile data can refine the content information. The content information can also be used as search terms for additional searching or other processing.

20 Claims, 5 Drawing Sheets

Related U.S. Application Data continuation of application No. 12/121,259, filed on May 15, 2008, now Pat. No. 8,406,531.

(56) References Cited

U.S. PATENT DOCUMENTS

| | | |
|---|---|---|
| 8,166,189 B1 | 4/2012 | McGuire |
| 2005/0030588 A1 | 2/2005 | Reese et al. |
| 2005/0160067 A1 | 7/2005 | Sohma et al. |
| 2005/0261990 A1 | 11/2005 | Gocht et al. |
| 2006/0240862 A1* | 10/2006 | Neven .................. G06K 9/228 455/550.1 |
| 2008/0200153 A1 | 8/2008 | Fitzpatrick et al. |
| 2009/0017798 A1 | 1/2009 | Pop |
| 2009/0278949 A1 | 11/2009 | McMahan et al. |
| 2009/0279794 A1 | 11/2009 | Brucher et al. |
| 2011/0123120 A1 | 5/2011 | Quafk |

\* cited by examiner

DATA ACCESS BASED ON CONTENT OF IMAGE RECORDED BY A MOBILE DEVICE

FIELD OF ART

The present invention is directed to accessing information based on imaging, and more particularly, to utilizing multiple images with a similar context correlation element, such as a nearby location, to determine information related to the content of an image.

BACKGROUND

It is difficult to get information into a mobile phone or into other mobile devices. Entering information typically involves typing on small keys to input a small set of words into a search window. This is even more difficult when typing special characters needed for uniform resource locators (URLs) and other special data. Rather than typing, some mobile devices enable a user to enter voice commands. However, the number and type of voice commands are usually very limited. It is also difficult for these mobile devices to interpret special characters from voice commands.

Further, users are often interested in information related to things they see, which are difficult to describe into voice commands or audio input. Many mobile devices now include a digital camera. Mobile device users typically can capture an image, and download the image and/or communicate the image in a message to another computing device. These cameras are often cheaper than a keyboard, but also often have a low resolution, such as three megapixels or less. These low resolution cameras are usually not suitable for object recognition.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description Of Embodiments, which is to be read in association with the accompanying drawings, wherein.

DETAILED DESCRIPTION OF EMBODIMENTS

Figure 1:
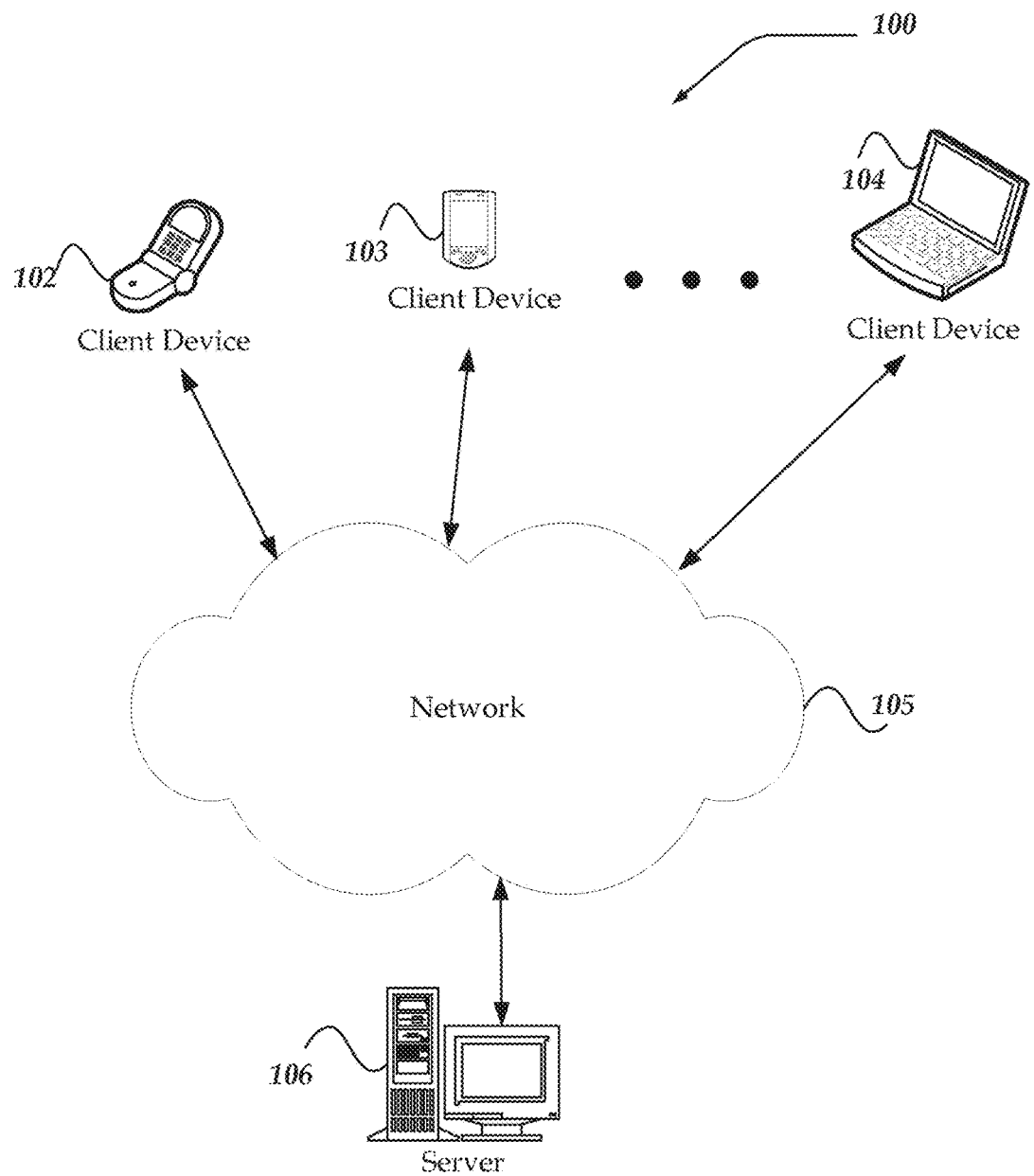
FIG. 1 illustrates a diagram of one embodiment of an exemplary system in which the invention may be practiced.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Briefly stated, embodiments of the invention are directed to using image data and contextual data to determine information about a scene. The content information may be directly accessed and returned to a user, may be used as search terms, as input to other processes, or used for other purposes. Captured image data, prior image analysis data, profile data, and other data that has been collected from numerous users, are used to better determine the subject matter of the captured image and information most likely desired by a user. Rather than relying on high resolution images and complex image processing techniques, the collection of various forms of data related to images and locations are used as community-based recognition.

Image data may comprise one or more images near a same location. The images may be taken by many different users with different cameras or other devices. The image(s) may include non-text information, such as logos, landmarks, or the like. In addition, or alternatively, the image(s) may include text information, such as character strings on a sign, a billboard, or the like. Contextual data may include the location where each image was taken, a user profile associated with a mobile device that took one or more of the images, or the like. In addition, or alternatively, contextual data may include information known about the location, such as merchants, buildings, street names, information about actions performed by one or more users near the location, or the like. An image may be analyzed to determine a histogram, identifying characteristics of the image. Some object recognition may be performed if image resolution permits. An image may also be analyzed to locate and recognize characters within the image. The image analyses may be evaluated relative to the analyses of other images by the same user and/or by other users to determine likely contents of an image. Similarly, contextual data may be evaluated to determine or revise the likely contents of the image and/or the likely information desired about an image. In one embodiment, determined, or recognized key words, categories, or other information may be submitted to a data search system to retrieve search results, web pages from specifically recognized uniform resource locators (URLs), phone directory information, advertisements, or other results. In addition, or alternatively, the results may be filtered, prioritized, categorized, or otherwise further processed.

Embodiments of this invention identify a meaning of an object that a user has photographed, and use this meaning as a request for more information. Conventionally image evaluation is done using image-recognition algorithms, embedded codes, or bar codes. Often these image cues are not reliable, the image quality is too low, and where image-recognition algorithms alone can not provide a desired level of accuracy. With enough contextual information, based on known object locations, the results of previous searches, or the like, embodiments of the invention can quickly decide that a user has taken a picture of a billboard advertising a recent action film or other specific information. Embodiments of the invention can show the user a custom display showing more information about the subject of the image, such as the recent film. The additional information may include the location and time of the nearest showing, and/or other information.

Embodiments of the invention use as much auxiliary information as possible to discern what the user is looking at in the image. This extra information is generally referred to herein as context or contextual information. The context generally includes the location of the camera, when the photo was taken, the time, the probability that other users took pictures at this location, the contents of other pictures (some of which may have been taken with higher-resolution cameras), information the user has looked for previously, the likelihood that different users selected information of a certain kind given the same context, the known location of objects near this location, and the like.

Context may be used in many different ways. The context may be used to bias a search towards objects that are likely to be present in the picture taken by the user. A centralized server may receive a low-quality image from a user and perform image-matching, using algorithms such as locality-sensitive hashing, to find a better quality image of the same object in the same location. Because the server received the better image in the past, the server already analyzed the better image. The information obtained by this prior analysis of the better image may have led the prior user to click on a resulting link, or perform another action that the server tracked. Thus, the server generally has more contextual information about likely desired information about the subject of the image. The contextual information can also be encoded with probabilistic models, which provides additional context about the subject of images. For example, the probability of seeing a Starbucks storefront might be higher in urban areas. As another example, location and other context may be used to recognize unique community information such as language characters. For instance, Chinese characters are mostly likely to be seen in a small number of locations in the United States. Based on a user's location, a server may focus efforts on recognizing the most likely characters in the language that is known to be prevalent in the area of a new image.

The work to analyze an image can also be distributed throughout a network, just as the context information may be distributed. A digital fingerprint for an image may be determined with a low-complexity algorithm that can be computed with minimal CPU power, such as a user's mobile device. The digital fingerprint and the user's location may be sent to a server to see if this image has already been received by the server. If that image was previously received by the server, analysis results for that image can be returned immediately, with minimal cost of re-analysis and minimal communications charges. While that network transaction is in process, the user's mobile device can do initial feature extraction and compression on the image in preparation for sending it to the server for more detailed analysis if needed. The process can start with simple image matching, proceed to more sophisticated algorithms, perform optical character recognition (OCR) to determine any text in the image, ask the user to input information about the image, or progress to other analysis. Some embodiments of the invention use as much context and image information as possible to narrow down user information request, and deliver relevant content. Previously tracked user behavior information can also be used to determine the most likely content of an image, and/or the most likely information desired by the user. The analysis may occur with just one button click, i.e., the click of the camera shutter. Additional details are provided below in the discussion of example embodiments.

Illustrative Operating Environment

FIG. 1 illustrates one embodiment of an environment in which the present invention may operate. However, not all of these components may be required to practice the invention, and variations in the arrangement and type of the components may be made without departing from the spirit or scope of the invention.

As shown in the figure, system 100 includes client devices 102-104, network 105, and a server 106. Network 105 is in communication with and enables communication between each of client devices 102-104, and server 106.

Client devices 102-104 may include virtually any computing device capable of receiving and sending a message over a network, such as network 105, to and from another computing device, such as content server 108, each other, and the like. The set of such devices may include devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, client devices 102-104 may be any device that is capable of connecting using a wired or wireless communication medium such as a personal digital assistant (PDA), pocket PC, wearable computer, and any other device that is equipped to communicate over a wired and/or wireless communication medium. The set of such devices may also include devices that typically connect using a wired communications medium such as personal computers, multiprocessor systems, microprocessor-based or programmable consumer electronics, network PCs, and the like.

Each client device within client devices 102-104 may include a browser application that is configured to send, receive, and display web pages, and the like. The browser application may be configured to receive and display graphics, text, multimedia, and the like, employing virtually any web based language, including, but not limited to Standard Generalized Markup Language (SMGL), such as HyperText Markup Language (HTML), extensible markup language (XML), a Handheld Device Markup Language (HDML), such as Wireless Markup Language (WML), WMLScript, JavaScript, and the like. Client devices 102-104 may further include a messaging application configured to send and/or receive a message to/from another computing device employing another mechanism, including, but not limited to instant messaging (IM), email, Short Message Service (SMS), Multimedia Message Service (MMS), internet relay chat (IRC), mIRC, Jabber, and the like.

Network 105 is configured to couple one computing device to another computing device to enable them to communicate. Network 105 is enabled to employ any form of computer readable media for communicating information from one electronic device to another. Also, network 105 may include a wireless interface, and/or a wired interface, such as the Internet, in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Digital Signal level 3 (DS3), Optical Carrier 3 (OC3), OC12, OC48, Asynchronous Transfer Mode (ATM), Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. Network 105 is constructed for use with various communication protocols and technologies, including transmission control protocol/internet protocol (TCP/IP), user datagram protocol (UDP), a wireless application protocol (WAP), global system for mobile communications (GSM), code division multiple access (CDMA), time division multiple access (TDMA), general packet radio service (GPRS), ultra wide band (UWB), IEEE 802.16 Worldwide Interoperability for Microwave Access (WiMax), and the like. In essence, network 105 includes any communication method by which information may travel between client devices 102-104, and/or server 106.

The media used to transmit information in communication links as described above generally includes any media that can be accessed by a computing device. Computer-readable media may include computer storage media, wired and wireless communication media, or any combination thereof. Additionally, computer-readable media typically embodies computer-readable instructions, data structures, program modules, or other data. Such data can be communicated through communication media in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wireless media such as fluids or space for acoustic, RF, infrared, and other wireless signals, and wired media such as twisted pair, coaxial cable, fiber optics, wave guides, and other wired media.

Server 106 may comprise multiple computing devices or a single computing device. Server 106 may provide image analysis services, such as determining histograms, performing OCR, comparing images to previously stored images, determining information about images, performing database operations, performing searches for additional information, storing information about images, tracking user behaviors, or the like. Server 106 may also provide content and/or other services such as web sites, online journals (e.g., blogs), photos, reviews, online services such as messaging, search, news, shopping, advertising, and/or the like. Server 106 may further provide administrative services, such as creation, modification, and management of relationships between network resources, such as web pages, or the like. Briefly, server 106 may include any computing device capable of connecting to network 105 and may manage services for a network user, such as a user of at least one of client devices 102-104. Devices that may operate as server 106 include dedicated server devices, personal computers, desktop computers, multiprocessor systems, microprocessor-based or programmable consumer electronics, network PCs, and the like. Server 106 and/or any of clients 102-104 may be implemented on one or more computing devices, such as a client described with regard to FIG. 2.

Illustrative Client Device

Figure 2:
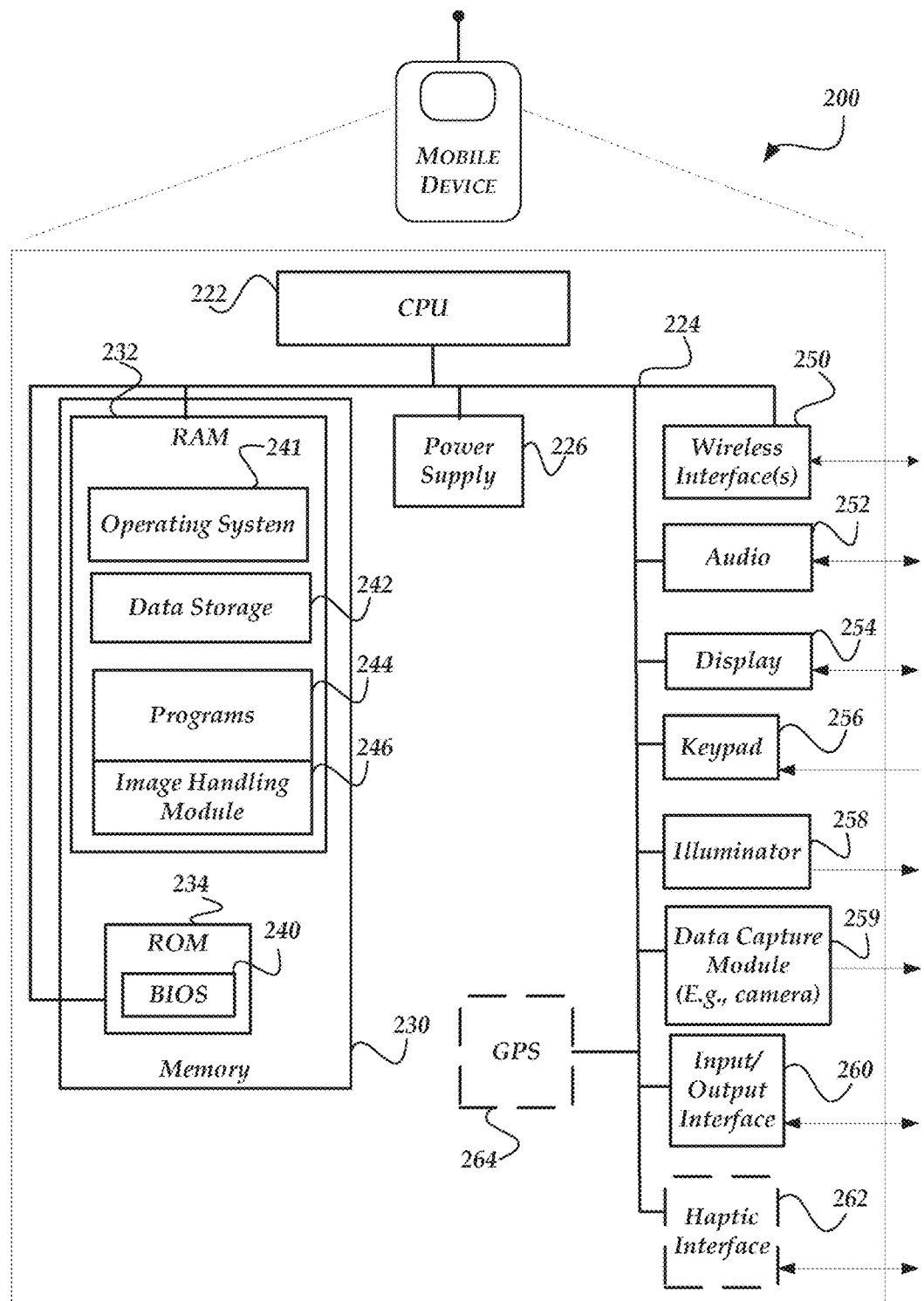
FIG. 2 shows a schematic diagram of one embodiment of an exemplary mobile device.

FIG. 2 shows an exemplary client device 200, according to one embodiment of the invention for use as a reference data collector device. In one embodiment, client device 200 is a mobile device, such as a laptop computer. Another example of a mobile device includes a PDA or a cellular telephone that is arranged to send and receive voice communications and messages such as SMS messages via one or more wireless communication interfaces. Oftentimes, mobile electronic devices will be capable of personal communication by connecting to one or more wireless networks, connecting to multiple nodes of a single wireless network, communicating over one or more channels to one or more networks, or otherwise engaging in one or more communication sessions. Generally, client device 200 may comprise any mobile or stationary electronic device. Such devices include laptops, palmtops, PDAs, handheld computers, cellular telephones, smart phones, pagers, radio frequency (RF) devices, infrared (IR) devices, integrated devices combining one or more of the preceding devices, and the like. Client device 200 may also comprise other electronic devices such as personal computers, multiprocessor systems, microprocessor-based or programmable consumer electronics, network PCs, wearable computers, and the like.

Client device 200 may include many more, or fewer, components than those shown in FIG. 2. However, the components shown are sufficient to disclose an illustrative embodiment for practicing the present invention. As shown in the figure, client device 200 includes a processing unit 222 in communication with a mass memory 230 via a bus 224.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of Windows®, UNIX, or LINUX®, or a specialized mobile communication operating system such as Windows Mobile™, the Symbian® operating system, or the like. The operating system may include, or interface with a Java® virtual machine module that enables control of hardware components and/or operating system operations via Java application programs.

Memory 230 further includes one or more data storage units 242, which can be utilized by client device 200 to store, among other things, programs 244 and/or other data. Programs 244 may include computer executable instructions which, when executed by client device 200, transmit, receive, render, and/or otherwise process markup pages such as HTML pages, XML pages, WAP pages (sometimes referred to as WAP cards), and the like. Accordingly, programs 244 may include a browser program of computer executable instructions, which may be run under control of operating system 241 to enable and manage requesting, receiving, and rendering markup pages and messages (e.g., HTTP, TCP/IP, SMS, MMS, IM, email, and/or other messages), audio, video, and enable telecommunication with another user of another client device. Other examples of application programs include calendars, contact managers, task managers, transcoders, database programs, word processing programs, spreadsheet programs, games, and so forth.

In addition, mass memory 230 stores an image handling module 246, which may be run as an external module under control of operating system 241, as a plug-in module within a browser, within a web page, or via another configuration. Image handling module 246 may perform initial processing or complete processing of image data, context information, user requests for image data, and other data related to images acquired or received by the mobile device.

Client device 200 also includes a power supply 226, one or more wireless interfaces 250, an audio interface 252, a display 254, a keypad 256, an illuminator 258, an optional data capture module 259, an input/output interface 260, an optional haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station, or directly with another client device. Wireless interface 250 includes circuitry for coupling client device 200 to one or more wireless networks, and is constructed for use with one or more communication protocols and technologies including, but not limited to, TCP/IP, UDP, GSM, CDMA, TDMA, SMS, GPRS, WAP, UWB, IEEE 802.16 (WiMax), and the like.

Audio interface 252 is arranged to produce and/or receive audio signals such as the sound of a human voice, music, and the like. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a client device. Display 254 may also include a touch sensitive screen arranged to receive input from an object such as a stylus or a digit from a human hand.

Keypad 256 may comprise any input device arranged to receive input from a user. For example, keypad 256 may include a keyboard, a push button numeric dial, or the like. Keypad 256 may also include command buttons that are associated with selecting and performing changeable processes. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the mobile device to illuminate in response to actions. Illuminator 258 may further be used as a flash for image capture. A data capture module 259, such as a camera, may be included in client device 200. The client device may obtain images, video, temperature, pressure, or other data.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, and the like. Optional haptic interface 262 is arranged to provide tactile feedback to a user of the client device. For example, the haptic interface may be employed to vibrate client device 200 in a particular way when another user of a client device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), Enhanced Observed Time Difference (E-OTD), cell identifier (CI), service area identifier (SAI), enhanced timing advance (ETA), base station subsystem (BSS), or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances.

Illustrative Network Device

Figure 3:
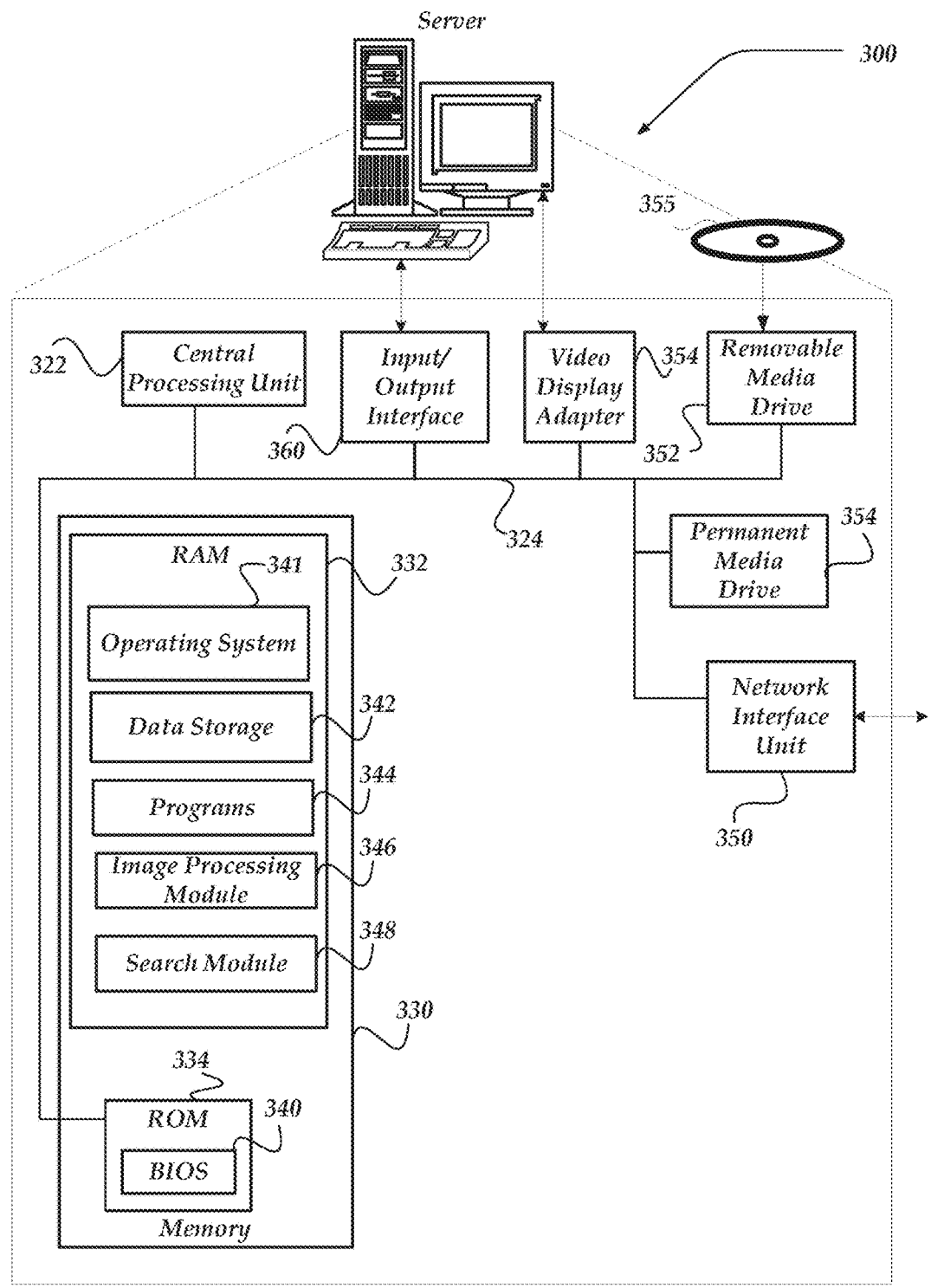
FIG. 3 illustrates a schematic diagram of one embodiment of an exemplary network device.

FIG. 3 shows one embodiment of a network device, according to one embodiment of the invention. Network device 300 may include many more, or fewer, components than those shown. The components shown, however, are sufficient to disclose an illustrative embodiment for practicing the invention. Network device 300 may represent, for example, taxonomy server 106, content server 108, or another client device of FIG. 1. For example purposes, network device 300 will be described as a server device.

As shown in the figure, server device 300 includes a processing unit 322 in communication with a mass memory 330 via a bus 324. Mass memory 330 generally includes a RAM 332, a ROM 334, and other storage means. Mass memory 330 illustrates a type of computer-readable media, namely computer storage media. Computer storage media may include volatile and nonvolatile, removable and non-removable media implemented in any method or technology for storage of information such as computer readable instructions, data structures, program modules or other data. Other examples of computer storage media include EEPROM, flash memory or other semiconductor memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

Mass memory 330 stores a basic input/output system ("BIOS") 340 for controlling low-level operation of server device 300. The mass memory also stores an operating system 341 for controlling the operation of server device 300. It will be appreciated that this component may include a general purpose operating system such as a version of Windows, UNIX, LINUX, Solaris, or the like. The operating system may also include, or interface with a Java virtual machine module that enables control of hardware components and/or operating system operations via Java application programs.

Mass memory 330 further includes one or more data storage units 342, which can be utilized by server device 300 to store, among other things, programs 344 and/or other data. Programs 344 may include computer executable instructions which can be executed by server device 300 to implement a markup handler application, such as an HTTP handler application for transmitting, receiving, and otherwise processing HTTP communications, a WAP handler application for transmitting, receiving, and otherwise processing WAP communications, and the like. Similarly, programs 344 can include a secure socket layer (SSL) handler application for handling secure connections, such as initiating communication with an external application in a secure fashion. Other examples of application programs include content management applications, messaging applications, schedulers, calendars, web services, transcoders, database programs, word processing programs, spreadsheet programs, and so forth. Accordingly, programs 344 can process images, audio, video, or markup pages, enable telecommunication with another user of another electronic device, and/or other services.

In addition, mass memory 330 stores an image processing module 346. Image processing module 346 may include computer executable instructions, which may be run under control of operating system 341 to analyze images, compare images, determine context information, access information associated with a location, evaluate user behavior data, determined search terms, or perform other processes related to images. In one embodiment, image processing module 346 generally communicates with an image handling module on a client device. Mass memory 330 may also include a search module 348, which may be part of, or in communication with image processing module 346. Search module 348 may comprise a search engine that generally performs data searches, such as content searches, searches for links to network resources, database searches, or the like.

Server device 300 also includes an input/output interface 360 for communicating with input/output devices such as a keyboard, mouse, wheel, joy stick, rocker switches, keypad, printer, scanner, and/or other input devices not specifically shown in FIG. 3. A user of server device 300 can use input/output devices to interact with a user interface that may be separate or integrated with operating system 341, programs 344, and/or other modules. Interaction with the user interface includes visual interaction via a display, and a video display adapter 354.

Server device 300 may include a removable media drive 352 and/or a permanent media drive 354 for computer-readable storage media. Removable media drive 352 can comprise one or more of an optical disc drive, a floppy disk drive, and/or a tape drive. Permanent or removable storage media may include volatile, nonvolatile, removable, and non-removable media implemented in any method or technology for storage of information, such as computer readable instructions, data structures, program modules, or other data. Examples of computer storage media include a CD-ROM 355, digital versatile disks (DVD) or other optical storage, magnetic cassettes, magnetic tape, magnetic disk storage or other magnetic storage devices, RAM, ROM, EEPROM, flash memory or other memory technology, or any other medium which can be used to store the desired information and which can be accessed by a computing device.

Via a network communication interface unit 350, server device 300 can communicate with a wide area network such as the Internet, a local area network, a wired telephone network, a cellular telephone network, or some other communications network, such as network 105 in FIG. 1. Network communication interface unit 350 is sometimes known as a transceiver, transceiving device, network interface card (NIC), and the like.

Illustrative Logic

Figure 4:
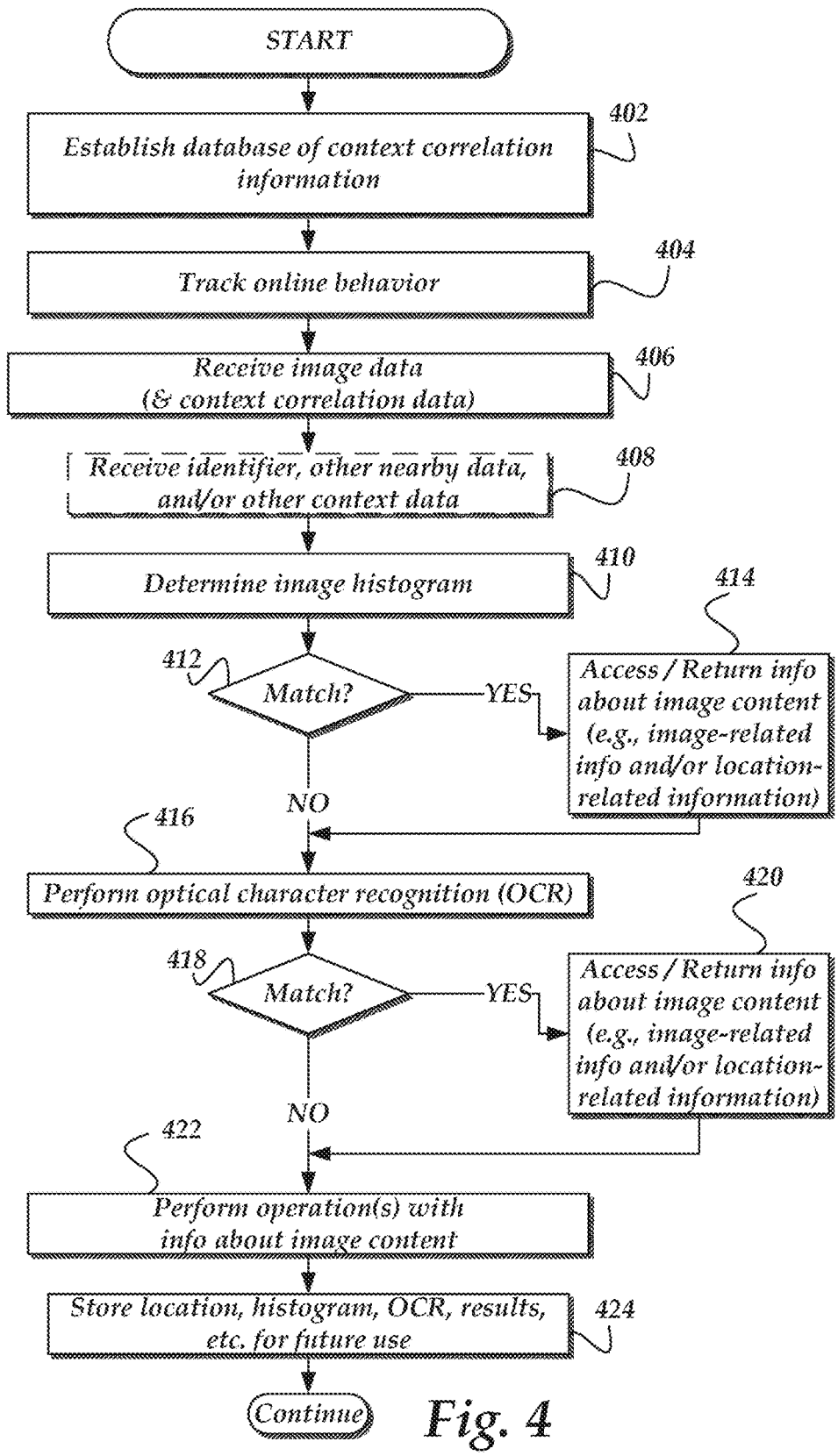
FIG. 4 illustrates a flow chart of example overall logic for determining and processing image-related information based on a captured image.

FIG. 4 illustrates an example flow diagram 400 for processing an information request based on image data. In one example embodiment, an information request may be a search request for additional information based on data determined from an image. At an operation 402, one or more data services establish one or more databases of contextual correlation data, such as location related information, user related information, time related data, or other data that indicates a context of images or used to correlate images. Examples of context correlation information may include geographic location data, advertising information, merchant information, communication node information, weather information, traffic information, or other information. Geographic location data may include GPS data, zip codes, street names, street addresses, building names, landmarks, or the like. Advertising information may include locations, content, and other information regarding billboards, painted wall signs, street-level signs, storefront signs, or the like. Advertising information may also include non-commercial signage. Merchant information may include merchant names, addresses, phone numbers, trademarks, logos, URLs, email addresses, products offered, inventory information, prices, or the like. Communication node information may include cellular tower locations, wifi hotspot locations, network address information, communication capability information, or the like. Real-time data may also be maintained through the database(s) of location related information. For example, data services may provide current weather conditions, traffic conditions, event activities, or the like.

Similarly, in this embodiment, the data service(s) track clients' online behaviors at an operation 404. Client user behaviors are generally associated with locations of the behaviors. With user permission, the data service(s) may track messaging, searches performed, URLs selected, purchases made, or the like. The data service(s) may also determine other parameters related to the online behaviors. For example, a data service may determine that a number of client users know each other based on message exchanges, may determine interests that a client user may have, or the like. A data service may also determine indirect relationships that comprise a user's social network.

At an operation 406, a client user captures image data with a mobile client device. The captured image data is generally associated with one or more context correlation data elements, such as location and/or other data discussed above. For example the user may take a photograph of a billboard with a cellular phone. The image and/or location data may be associated with a time stamp, a cell tower location, a wifi network node address, or other data. The billboard may include a merchant name, a logo, a phone number, a URL, or other content. The client device may perform further processing locally, or may communicate the image and/or location data to a server. For example, the client device may be capable of performing some image histogram analysis, image fingerprinting analysis, or the like. The client device may perform such analyses and communicate the results to the server. However, in many cases, client devices, such as cell phone, will have limited image processing capability. Such devices will generally send raw or compressed image data and location data to the server.

At an optional operation 408, the server may receive a client identifier for the client that captured the image, such as a phone number, a mobile identification number, user identifier, or the like. The server may use the client identifier to access previously stored information associated with the client identifier, such as prior images submitted, prior locations submitted, client device capabilities, user behaviors, aggregated information related to the client identifier, or the like. The server, or the client device, may also receive other information associated with the location of the image. As discussed above, such information may be pre-established location data or may include real-time data related to the location. For example, the server may access or receive merchant information that is associated with a location that is near the image capture location. This merchant information may identify merchants and their distance from the image capture location. Similarly, the server may access or receive other context data related to the image capture location, such as a street name, zip code, weather conditions, traffic conditions, or the like.

At an operation 410, the server or the client device analyzes the captured image to determine an image histogram. The image histogram generally identifies color parameters and other characteristics of the image, so that images can be readily compared. In an idealized situation, where everybody took pictures with the same camera and at the same location, then simple image comparison by comparing corresponding image pixels would give an exact measure of whether the images are taken of the same object. But this kind of simple measure generally is generally not sufficient.

In a simple case, two images can be compared for similarity by computing a histogram of the colors found in the image. The metric used for determining whether two images are similar is just a matter of comparing the fraction of pixels in each of (dozens) of different colors. This metric is useful because it generally works no matter how the cameras are rotated, and tends to be immune to scale and transformations. For example, it generally works well for determining which billboard is being seen, since the colors are unique between different companies. It may be less effective to determine which of several gray-stone bank buildings one is standing in front of in a captured image.

More sophisticated approaches, such as those based on salient points, are generally more robust. In this approach, an operator is run across the image that identifies points in the image that are especially salient, or that pop out no matter what the orientation. These are often image features such as corners. Once the salient points are identified they are characterized by any number of measures including color, local texture, and orientation. Two images are generally judged to be similar if a high percentage of salient points in each image can be matched, and they have the right alignment. Further details of example such techniques are described in "Object Recognition from Local Scale-Invariant Features," by David G. Lowe.

At a decision operation 412, the server may check whether a previously stored histogram (or salient points, etc.) matches a histogram (or salient points, etc.) of the newly received image within a predefined matching threshold. In this example embodiment, the server selects histogram data from prior received images, for comparison against the histogram results of the captured image. To narrow down the number of comparisons, the server may select prior image analysis data based on a context correlation element, such as a predefined radius from the location of the captured image. In one embodiment, the server may select a "best" prior image, or a top number of highest resolution images within a certain distance of the currently captured image. In addition, or alternatively, the server may use other criteria to filter, prioritize, or otherwise select prior histogram data. Other criteria may include histogram characteristics within certain ranges of the captured image, resolution of images in various databases, only prior image analysis data that are associated with a certain set of user identifiers or mobile device identifiers, prior image analysis data that are within a certain number of known blocks of the image capture location, or the like.

Once prior image analysis data is selected, the server compares the selected data against the image analysis results for the captured image. Another image may have a very similar image histogram, even though the other image may have different zoom, light, or other image parameters. For example, one image may capture a billboard from a certain distance and at a certain time of day. Another image may capture the same billboard from a different distance and at a different time of day. The image histogram of each image can be compared to determine whether they capture the same billboard. Alternatively, a part of an image may have a histogram that is very similar to the histogram of a part of another image. The similar parts may be detected and compared. Similar parts may correspond to logos or other non-character symbols. Each histogram can function as a digital fingerprint to identify an image. Histograms that are the same, or statistically within a predefined threshold, may be considered equivalent. These comparisons help identify the content of the image.

If user profile data is associated with the captured image and at least one of the prior images, prior user profile data may also be selected and compared with that of the currently captured image. This may help resolve uncertainty about resolve possible logos, provide prior merchant interaction information, or provide other additional context information regarding the captured image.

In general, if a match is found, the server may accesses any of the above, or other descriptive information, search terms, or other information related to the prior images and/or information related to context correlation data used to relate to the captured image. In one embodiment, the context correlation data is the location at which the current and prior images were captured. In some embodiments, the server may perform a search, perform other processing, and/or immediately return image content information, such as previously stored image-related information and/or previously stored location-related information to the client device, at an operation 414. The image content information may identify only contents of the image or may comprise information about the contents of the image. In some embodiments, the server may end its image processing operations at this point, or may continue with further processing, as shown, to obtain additional image-related information and/or location-related information.

Similar to the histogram evaluation, at an operation 416, the server or the client device may perform an optical character recognition (OCR) analysis to identify characters within the image. In this embodiment, the server optically recognizes characters that appear in a captured image of a scene. Such images are generally photographs rather than simple black and white pages, so more involved techniques, such as those used for video OCR are useful. One process consists of two steps: detection and recognition. Detection generally identifies likely regions of the image that include textures with the statistical behavior that indicates it could be text. For example, western alphabets have many horizontal and vertical lines in close proximity. Once likely regions are identified, pattern recognition methods, perhaps with a language model to constrain the possible words, are used to determine the most likely text. Details of example techniques for OCR is described in "Feature Extraction Approaches For Optical Character Recognition," by Roman Yampolskiy, including a chapter by Rainer Lienhart.

At a decision operation 418 of this embodiment, the server selects OCR data from prior received images, for comparison against the OCR results of the captured image. Similar to the histogram analysis, the server may select prior image analysis data based on context correlation data such as a predefined radius from the location of the captured image. In one embodiment, the server may select a "best" prior image, or a top number of highest resolution images within a certain distance of the currently captured image. In addition, or alternatively, the server may use other criteria to filter, prioritize, or otherwise select prior OCR data. Other criteria may include resolution of images in various databases, a minimum required number of words similar to those of the OCR results, only prior image analysis data that are associated with a certain set of user identifiers or mobile device identifiers, prior image analysis data that are within a certain number of known blocks of the image capture location, or the like.

Once prior OCR image analysis data is selected, the server compares the selected data against the image analysis results for the captured image. Recognized characters can be compared to determine matching words, URLs, phone numbers, or the like. A match may be based on a predefined matching threshold. For example, a predefined percentage of character strings may be required to match, to conclude that a match exists between the captured image and a previously obtained image. These OCR comparisons may independently help identify the content of the image, or may be used in conjunction with the histogram comparisons.

Also similar to the histogram analysis, if user profile data is associated with the captured image and at least one of the prior OCR images, prior user profile data may also be selected and compared with that of the currently captured image. This may help resolve uncertainty about partially recognized characters or strings, resolve uncertainty based on possible logos, provide prior merchant interaction information, or provide other additional context information regarding the captured image.

In general, if a match is found, the server may accesses any of the above, or other descriptive information, search terms, or other information related to prior images and/or information related to the location at which the current and prior images were captured. In some embodiments, the server may perform a search, perform other processing, and/or immediately return image content information, such as previously stored image-related and/or previously stored location-related information to the client device, at an operation 420. In some embodiments, the server may end its image processing operations at this point, or may continue with further processing, as shown, to obtain additional image-related information and/or location-related information, determine image-related information and/or location information that is likely desired by the client user, perform a search, or perform other operations.

In this example embodiment, the server uses the information obtained through histogram and OCR analyses to perform one or more selectable or automatic operations with the image-related information and/or the location-related information, at an operation 422. Such operations may include performing statistical analysis to determine likely content, search terms, or other image-related information of the currently captured image. The server may combine information gathered across all information sources, such as image, location, nearby points of interest from the database, click-through data from this and other users, or the like. The server may also make a decision if there is conflicting or ambiguous information. The server may access data services, return links, request additional user input, or other operations. In one embodiment, the server performs a search, as described in more detail with regard to FIG. 5.

At an operation 424, the server stores location information, histogram information, OCR information, operation results, or other data. The stored information is generally indexed to the captured image, so that the stored information can be used to evaluate a subsequent captured image.

Figure 5:
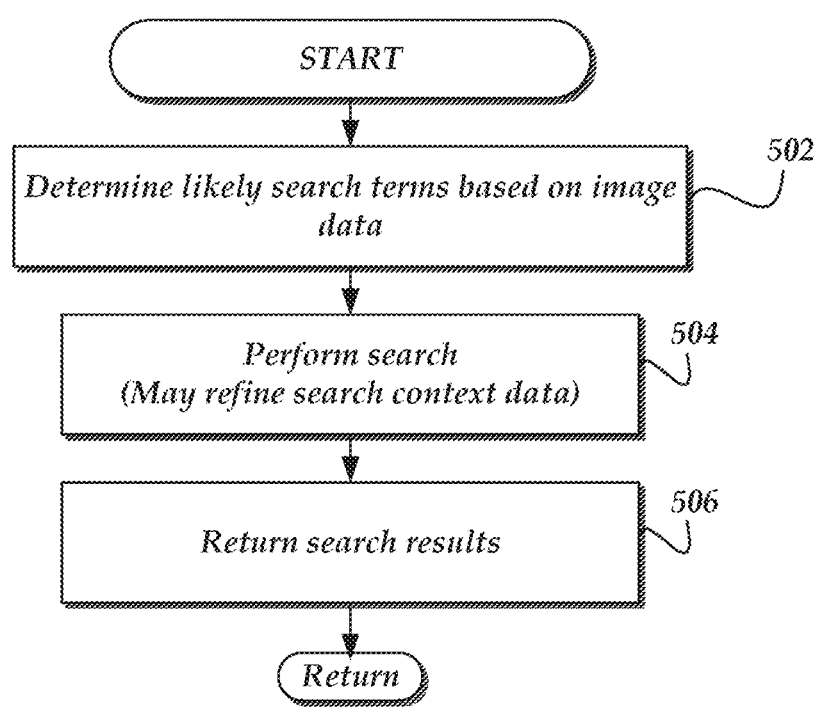
FIG. 5 illustrates a flow chart of example logic for determining search terms and results based on a captured image.

FIG. 5 illustrates a flow chart of example logic for determining search terms and results based on a captured image. In some embodiments, image content or user-desired information may be identified by likely search terms within, or based on the currently captured image data and similar image data. The terms may include the recognized characters, matching strings, matching histogram characteristics, manually pre-populated terms, the location of the captured image, or the like. The histogram data of the captured image may be used as search input to other histogram data bases or other image data bases. Some embodiments may use weighting to determine primarily phone numbers, or URLs, or merchant names, or other preferred terms within, or based on the currently captured image. Other embodiments may use weighting to determine primarily scientific terms, such as those in a laboratory, or art terms, such as those in a museum, or the like.

In this example embodiment to determine likely search terms based on the image data, the server uses contextual image-related data to determine more likely search terms, at an operation 502. User profile data, individual or aggregated behavior data, device identifier data, or other such data may be searched based on the image-related data. This contextual data may also be used to weight the determination of final search terms. For example, user profile data associated with the captured data may indicate that the user of the image capturing mobile device has often searched for movie information. Prior images near the same location may also be associated with movie terms. Thus, recognized characters and histogram data may likely correspond to a theater billboard, listing movies that are currently showing. Accordingly, the server may determine search words, phrases, actor names, theater brands, or other terms that are related to movies.

Tracked location data may also be used to determine probability patterns relative to search terms. Location data is generally combined with image features. Location estimates generally include one or more probability estimates. For example, an estimate may indicate the probability that an image is taken from a certain direction and a probably of distance. This generally forms a Gaussian bump in probability space at that point. Within this bump the server will generally know of some objects with a probability that can be estimates from previous images and any geographic information known to the server. For example, the server may know that there is a bank near the location of the captured image. Similarly, image classification work, or OCR can also have a probability associated with it. Determining the subject of the captured image can be improved by looking for a peak in a posterior probability estimate. This may be a multiplicative function of the known position probability estimates, the prior information known about the area near the captured image, and the image-recognition results. The server may also regularize the calculation by assuming that the prior information does not go all the way to zero, since a new building or a new billboard could be built at anytime. For example, it is possible that a new common retail outlet may appear in a short time.

Based on the prior image analysis data, the prior images generally have semantic terms associated with each prior image that may be used for search matching and other processing. For example, the terms associated with an image may identify a location of a specific landing page, a service, or other network resource. The network resource may be provided by or sponsored by an advertiser, a merchant, or the like. In addition, or alternatively, the terms associated with an image may provide a key to one or more search results pages. The search database(s) may be limited to, or include, databases of registered advertisers or merchants who provided names, phone numbers, URLs, email addresses, locations, or other information regarding the advertisers' or merchants' billboards, signs, or other items that may be captured in images. The advertising or merchant databases, or their contents, may be weighted, filtered, prioritized, or the like based on placement bids, premium service charges, or the like. Intermediate results may be obtained and used to refine search terms.

The server returns search terms that are relevant to the captured image. For example, the server may return a merchant name, phone number, and URL that is most likely the subject of the captured image. The server may automatically obtain information based on the returned search terms, or may send the terms to the mobile device that captured the image. The user of the mobile device may decide whether to submit the returned terms through a browser to a general search engine.

At an operation 504, the server, or another search engine, performs a search based on the determined search terms or those determined search terms that the user selected. One or more search iterations may be performed, and/or multiple databases may be searched. In a results operation 506, the server may return a WML page, an XHTML page, a text page, an SMS message, or other information that may be indexed to the prior images. The returned page may be considered a home page about the object captured in the image. Returning the home page may cause the server to charge a fee to a merchant, advertiser, or other sponsor(s) of the home page. This may generate revenue on the basis of a cost per picture, or cost per camera click.

The above specification, examples, and data provide a complete description of the manufacture and use of the composition of the invention. For example, the search process, or other operations, may be performed based on only matching histogram information; or based only on matching OCR data. As another example, captured audio data may be evaluated in a similar manner to determine search terms or resulting information. Similarly, captured video data may be evaluated in a similar manner to determine search terms or resulting information. The matching thresholds may also be adjusted as additional images are obtained near locations. Since many embodiments of the invention can be made without departing from the spirit and scope of the invention, the invention resides in the claims hereinafter appended.

What is claimed as new and desired to be protected by Letters Patent is:

1. A method comprising:
    receiving, by a processor, image data representing an image captured by a mobile device;
    analyzing, by the processor, the image data to determine an image histogram;
    receiving, by the processor, a mobile device identifier of the mobile device;
    accessing, by the processor and based on the mobile device identifier, profile information;
    receiving, by the processor, location data indicating a location at which the image was captured by the mobile device;
    receiving, by the processor, a time at which the image was captured by the mobile device;
    determining, by the processor, image attribute information from the image data;
    determining, by the processor, whether the image attribute information matches previously obtained attribute information within a predefined matching threshold, the previously obtained attribute information obtained from previously obtained image data representing a prior image captured at a second location within a predefined distance from the location and the time at which the image was captured by the mobile device, the previously obtained image data obtained with a second mobile device;
    selecting, by the processor, the previously obtained image data based on context correlation data, the context correlation data comprising the location and the second location;
    comparing, by the processor, the selected data against the image histogram; and
    determining, by the processor, search terms based on the image data and the image histogram.

2. The method of claim 1, wherein the image attribute information comprises a character determined from the image by optical character recognition, and the previously obtained attribute information comprises a previously determined character of the prior image.

3. The method of claim 1, further comprising identifying image content of the image by the search terms.

4. The method of claim 1, further comprising weighing a determination of the search terms.

5. The method of claim 1, further comprising determining probability patterns relative to the search terms using the location data.

6. The method of claim 5, further comprising combining the location data with image features.

7. The method of claim 6, further comprising estimating a probability that the image is taken from a certain direction and probability of distance.

8. The method of claim 1, wherein the image content information comprises an identifier of merchant information.

9. The method of claim 1, wherein the profile information includes user behavior information associated with a user of the mobile device.

10. The method of claim 1, further comprising:
    determining, by the processor, a priority level of each of a plurality of prior images captured within the predefined distance; and
selecting, by the processor, the previously obtained attribute information based on a determined priority level of the prior image represented by the previously obtained image data.

11. The method of claim 1, further comprising returning, by the processor, the image content information to the mobile device.

12. A computing device, comprising:
a processor;
a storage medium for tangibly storing thereon program logic for execution by the processor, the stored program logic comprising:
image data receiving logic executed by the processor for receiving image data representing an image captured by a mobile device;
image data analyzing logic executed by the processor for analyzing the image data to determine an image histogram;
mobile device identifier receiving logic executed by the processor for receiving a mobile device identifier of the mobile device;
profile information accessing logic executed by the processor for accessing, based on the mobile device identifier, profile information;
location data receiving logic executed by the processor for receiving location data indicating a location at which the image was captured by the mobile device;
time receiving logic executed by the processor for receiving a time at which the image was captured by the mobile device;
image attribute information determining logic executed by the processor for determining image attribute information from the image data;
determining logic executed by the processor for determining whether the image attribute information matches previously obtained attribute information within a predefined matching threshold, the previously obtained attribute information obtained from previously obtained image data representing a prior image captured at a second location within a predefined distance from the location and the time at which the image was captured by the mobile device, the previously obtained image data obtained with a second mobile device;
image data selecting logic executed by the processor for selecting the previously obtained image data based on context correlation data, the context correlation data comprising the location and the second location;
comparing logic executed by the processor for comparing the selected data against the image histogram; and
search term determining logic executed by the processor for determining search terms based on the image data and the image histogram.

13. The computing device of claim 12, wherein the image attribute information comprises a character determined from the image by optical character recognition, and the previously obtained attribute information comprises a previously determined character of the prior image.

14. The computing device of claim 12, further comprising image content identifying logic executed by the processor for identifying image content of the image by the search terms.

15. The computing device of claim 12, further comprising weighing logic executed by the processor for weighing a determination of the search terms.

16. The computing device of claim 12, further comprising probability pattern determining logic executed by the processor for determining probability patterns relative to the search terms using the location data.

17. The computing device of claim 16, further comprising combining logic executed by the processor for combining the location data with image features.

18. The computing device of claim 17, further comprising estimating logic executed by the processor for estimating a probability that the image is taken from a certain direction and probability of distance.

19. The computing device of claim 12, wherein the image content information comprises an identifier of merchant information.

20. A non-transitory computer-readable storage medium comprising computer-executable instructions for execution by a processor, the instructions comprising:
receiving, by the processor, image data representing an image captured by a mobile device;
analyzing, by the processor, the image data to determine an image histogram;
receiving, by the processor, a mobile device identifier of the mobile device;
accessing, by the processor and based on the mobile device identifier, profile information;
receiving, by the processor, location data indicating a location at which the image was captured by the mobile device;
receiving, by the processor, a time at which the image was captured by the mobile device;
determining, by the processor, image attribute information from the image data;
determining, by the processor, whether the image attribute information matches previously obtained attribute information within a predefined matching threshold, the previously obtained attribute information obtained from previously obtained image data representing a prior image captured at a second location within a predefined distance from the location and the time at which the image was captured by the mobile device, the previously obtained image data obtained with a second mobile device;
selecting, by the processor, the previously obtained image data based on context correlation data, the context correlation data comprising the location and the second location;
comparing, by the processor, the selected data against the image histogram; and
determining, by the processor, search terms based on the image data and the image histogram.

* * * * *